(12) United States Patent
Gerstel

(10) Patent No.: US 7,613,392 B2
(45) Date of Patent: *Nov. 3, 2009

(54) 1:N PROTECTION IN AN OPTICAL TERMINAL

(75) Inventor: Ornan A. Gerstel, Los Altos, CA (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/497,390

(22) Filed: Aug. 2, 2006

(65) Prior Publication Data

US 2006/0269282 A1 Nov. 30, 2006

Related U.S. Application Data

(63) Continuation of application No. 09/464,077, filed on Dec. 16, 1999, now Pat. No. 7,099,578.

(51) Int. Cl.
 *H04B 10/00* (2006.01)
(52) U.S. Cl. .................. 398/5; 398/2; 398/3; 398/4; 398/10; 398/17; 398/22; 398/30; 398/33; 398/79; 370/216; 370/217; 370/218; 370/227; 370/228
(58) Field of Classification Search .............. 398/5, 398/2, 3, 7, 4, 10, 24, 17, 22, 41, 30, 33, 398/31, 141, 23, 145, 135, 140, 42, 45, 79, 398/139, 151; 370/216, 217, 218, 219, 220, 370/221, 227, 228, 225
See application file for complete search history.

(56) References Cited

U.S. PATENT DOCUMENTS 4,365,247 A 12/1982 Bargeton et al. ....... 340/825.01
4,633,246 A 12/1986 Jones et al. ............ 340/825.05

(Continued)

FOREIGN PATENT DOCUMENTS

EP 0 877 502 11/1998

OTHER PUBLICATIONS

J. L. Zyskind et al., *Fast Link Control Protection For Surviving Channels In Multiwavelength Optical Networks*, 22nd European Conference on Optical Communication—ECOC 1996, Oslo (5 pages).

(Continued)

*Primary Examiner*—Hanh Phan
(74) *Attorney, Agent, or Firm*—Fitzpatrick, Cella, Harper & Scinto

(57) ABSTRACT

A communication network comprising at least one first terminal, at least one second terminal, a plurality of links, and at least first and second nodes. The first node is bidirectionally coupled to the first terminal through at least a first one of the links, and also is bidirectionally coupled to the second terminal through at least a second link and the second node. Preferably, the first node comprises a plurality of communication paths, each of which is coupled at a first end thereof to at least one corresponding first link. Second ends of the communication paths are all coupled to the second link, through a multiplexing device, and route signals between the first and second links. The first node also preferably comprises at least one alternate communication path having a first end coupled through the multiplexing device to the second link, at least one switch that is coupled to the alternate communication path, and a detector for detecting a failure in at least one of the communication paths. A controller is coupled to the detector and the switch. The controller is responsive to the detector detecting a failure in at least one of the communication paths for controlling the switch to couple the alternate communication path to a corresponding first link, thereby enabling a signal to be routed between that first link and the second link through the alternate communication path.

21 Claims, 9 Drawing Sheets

U.S. PATENT DOCUMENTS

| | | | |
|---|---|---|---|
| 5,113,391 A | 5/1992 | Gupta et al. | 370/84 |
| 5,159,595 A | 10/1992 | Flanagan et al. | 370/85.15 |
| 5,163,041 A | 11/1992 | Moriyama | 370/16 |
| 5,214,692 A | 5/1993 | Chack et al. | 379/265 |
| 5,216,666 A | 6/1993 | Stalick | 370/16.1 |
| 5,299,293 A | 3/1994 | Mestdagh et al. | 398/24 |
| 5,313,456 A | 5/1994 | Sugawara | 370/16 |
| 5,331,631 A | 7/1994 | Teraslinna | 370/60 |
| 5,333,130 A | 7/1994 | Weissmann et al. | 370/16 |
| 5,341,364 A | 8/1994 | Marra et al. | 370/16.1 |
| 5,406,401 A | 4/1995 | Kremer | 359/110 |
| 5,412,652 A | 5/1995 | Lu | 370/85.12 |
| 5,434,691 A | 7/1995 | Yamane | 359/117 |
| 5,442,620 A | 8/1995 | Kremer | 370/16.1 |
| 5,475,676 A | 12/1995 | Takatori et al. | 370/16.1 |
| 5,479,608 A | 12/1995 | Richardson | 395/182.02 |
| 5,515,361 A | 5/1996 | Li et al. | 370/15 |
| 5,638,358 A | 6/1997 | Hagi | 370/228 |
| 5,680,235 A | 10/1997 | Johansson | 359/110 |
| 5,729,527 A | 3/1998 | Gerstel et al. | 370/228 |
| 5,793,746 A | 8/1998 | Gerstel et al. | 370/228 |
| 5,949,563 A | 9/1999 | Takada | 398/7 |
| 5,986,783 A | 11/1999 | Sharma et al. | 359/119 |
| 6,025,941 A | 2/2000 | Srivastava et al. | 359/119 |
| 6,081,359 A | 6/2000 | Takehana et al. | 398/1 |
| 6,084,694 A | 7/2000 | Milton et al. | 359/124 |
| 6,477,288 B1 | 11/2002 | Sato | 385/16 |
| 6,915,075 B1 | 7/2005 | Oberg et al. | 398/9 |
| 7,099,578 B1 * | 8/2006 | Gerstel | 398/5 |
| 2002/0071154 A1 | 6/2002 | Gerstel et al. | 359/124 |

FOREIGN PATENT DOCUMENTS

| | | |
|---|---|---|
| EP | 0 903 882 A2 | 3/1999 |
| EP | 0 920 153 A2 | 6/1999 |
| EP | 0 928 082 A1 | 7/1999 |
| EP | 0 948 153 A2 | 10/1999 |
| JP | 53-68046 | 6/1978 |
| JP | 63-161748 | 7/1988 |
| JP | 3-107242 | 5/1991 |
| SE | 9800545 | 8/1999 |
| WO | 99/44317 | 9/1999 |
| WO | WO 99/44317 | 9/1999 |

OTHER PUBLICATIONS

N. Nagatsu et al., *Flexible OADM Architecture and Its Impact on WDM Ring Evolution For Robust and Large-Scale Optical Transport Networks*, IEICE Transactions on Electronics, Institute of Electronics Information and Comm. Eng. Tokyo, Japan, vol. E82-C, No. 8 (Aug. 1999) pp. 1371-1379.

Ornan Gerstel, et al., "Optical Layer Survivability—An Implementation Perspective", IEEE Journal On Selected Areas In Communications, vol. 18, No. 10, pp. 1885-1899, Oct. 2000.

* cited by examiner

1:N PROTECTION IN AN OPTICAL TERMINAL

This application is a continuation of U.S. application Ser. No. 09/464,077, filed Dec. 16, 1999, now U.S. Pat. No. 7,099,578, issued Aug. 29, 2006.

FIELD OF THE INVENTION

This invention relates generally to optical communications networks, and, in particular, to an apparatus for providing 1:N ("one-to-N") protection in an optical terminal of a Wavelength-Division Multiplexed (WDM) multi-channel optical communications network.

BACKGROUND OF THE INVENTION

It is known to provide protection in optical networks against line failures, node failures, and the like, by equipping such networks with bypass equipment for bypassing failed components and routing signals to their intended destinations. An example of a prior art network that includes bypass equipment is depicted in FIG. 1. The network includes optical line terminals (OLTs), or nodes, 100 and 200, and a plurality of terminals 100-1 to 100-n, 200-1 to 200-n. The nodes 100 and 200 are bidirectionally coupled to one another through a bidirectional transmission link (L).

The node 100 comprises a plurality of bidirectional communication paths P-1 to P-n and P-1' to P-n' that are interposed between an interface (I') and a WDM multiplexer/demultiplexer (MUX/DEMUX) 106 of the node 100. Bidirectional transponders 102-1 to 102-n are included in the communication paths P-1 to P-n, respectively, and bidirectional transponders 104-1 to 104-n are included in the communication paths P-1' to P-n', respectively, of node 100. Although not shown in FIG. 1, the node 200 is assumed to include components which mirror those of node 100.

Bidirectional links L100-1 to L100-n couple an interface IF1 of each of the terminals 100-1 to 100-n, respectively, to node interface (I'), and bidirectional links L200-1 to L200-n couple interface IF1 of each of the terminals 200-1 to 200-n, respectively, to the node 200. Similarly, bidirectional links BL100-1 to BL100-n couple an interface IF2 of each of the terminals 100-i to 100-n, respectively, to the interface (I') of node 100, and bidirectional links BL200-1 to BL200-n couple interface IF2 of the terminals 200-1 to 200-n, respectively, to the node 200.

Each of the terminals 100-1 to 100-n and 200-1 to 200-n normally transceives signals through the interface IF1 of that terminal, and transceives signals through the other interface IF2 only in cases where the interface IF1 and/or the link coupled thereto is inactive. Accordingly, the interface IF1 is known to persons skilled in the art as a "working" interface, and the links L100-1 to L100-n and L200-1 to L200-n coupled thereto are known as "working" links. Also, the interface IF2 is known in the art as a "protection" interface, the links BL100-1 to BL100-n and BL200-1 to BL200-n are known as "protection" links, and the transponders 104-1 to 104-n are known as "protection" transponders. Moreover, the terminals 100-1 to 100-n and 200-1 to 200-n are known as "protected" terminals, since they include the protection interface IF2, whereas terminals that do not include a protection interface IF2 are known as "unprotected" terminals.

The so-called protected terminals operate in the following manner In the event that a failure occurs in the interface IF1 of a terminal 100-1 to 100-n, 200-1 to 200-n, and/or in a link or communication path coupled to that interface, the terminal recognizes the occurrence of the failure and discontinues transceiving signals through the interface IF1. Assuming that the terminal also recognizes that the protection link coupled thereto is active, the terminal resumes transceiving the signals over that protection link through the protection interface IF2. As a result, the failed component is bypassed, and the signals are communicated through the various protection components of the network.

Unfortunately, the above-described network has drawbacks in that it requires the use of many protection components (e.g., transponders 104-1 to 104-n) in the nodes 100 and 200, and those nodes 100 and 200 are generally expensive. Also, the above-described network does not provide any failure protection for unprotected terminals (not shown) that may be included in the network. Accordingly, it would be desirable to provide a network which overcomes the above-described drawbacks, and which provides protection against network component failures for both protected terminals and unprotected terminals. It would also be desirable to provide an optical line terminal that is less expensive than those of the prior art network described above.

SUMMARY OF THE INVENTION

It is a first object of this invention to provide a network which provides protection against network component failures for both protected and unprotected terminals It is a another object of this invention to provide an improved optical line terminal for a network, wherein the optical line terminal protects against network component failures.

It is a further object of this invention to provide 1:N protection in an optical line terminal that is less expensive than prior art line terminals.

Further objects and advantages of this invention will become apparent from a consideration of the drawings and ensuing description.

The foregoing and other problems are overcome and the objects of the invention are realized by a method for protecting against component failures in an optical communications network, and an optical communications network that operates in accordance with the method. In accordance with one embodiment of the invention, the communications network comprises at least one first terminal, at least one second terminal, a plurality of links, and at least a first line node (also referred to as an "optical line terminal"). The first line node is bidirectionally coupled to the first terminal through at least a first one of the links, and is also bidirectionally coupled to a second terminal through at least a second one of the links. The network is preferably a Wavelength-Division Multiplexed (WDM) multi-channel optical network.

Preferably, the first line node comprises a plurality of first communication paths, each of which has a first end and a second end. The first end of each first communication path is coupled to a corresponding first link, and a second end of each first communication path is coupled through a multiplexing device to the second link. Each of the first communication paths routes signals, received by the first line node, between a respective first link and the second link.

In accordance with an aspect of this invention, the first line node also preferably comprises (a) at least one first alternate communication path having a first end coupled to the at least one second link through the multiplexing device, (b) at least one first switch that is coupled to a second end of the first alternate communication path, and (c) a first detector. The first detector monitors the first communication paths for an occurrence of a failure in at least one of those paths. A first controller is coupled to the first detector and the first switch. The first controller is responsive to receiving information from the first detector indicating that a failure has been detected in at least one of the first communication paths for controlling the first switch to couple the first alternate communication path to a corresponding one of the first links, thereby enabling a signal to be routed between that first link and the second link through the first alternate communication path. As a result, the failed communication path is bypassed and the signal is forwarded towards its intended destination.

In accordance with one embodiment of this invention, protection against network component failures is provided for "unprotected" terminals, and the first line node is equipped with one or more splitters. Each splitter has an input and a first output that are both coupled in a respective one of the first communication paths. Each splitter splits signals applied to its input terminal into corresponding signal portions and outputs resulting first and second signal portions through the first output and a second splitter output, respectively. In this embodiment, the first controller responds to receiving the information from the first detector by controlling the first switch to couple the second output of the splitter from the failed path to the second link, through the alternate communication path.

Also in accordance with this embodiment of the invention, the communication network further comprises at least one second line node that is interposed between the second link and the second terminal. The first and second line nodes are preferably coupled together through the second link, and the second line node is coupled to the second terminal through at least one third link. The second line node preferably comprises a plurality of second communication paths, each of which has a first end and a second end. The first ends of the second communication paths are coupled to the second link through a demultiplexing device, and the second end of each second communication path is coupled to a corresponding third link, for providing a communication route between the second and third links. Each of the second communication paths is coupled to a corresponding one of the first communication paths through the second link.

The second line node preferably also comprises (a) at least one second alternate communication path having a first end that is coupled to the second link, (b) at least one second switch that is coupled to a second end of the second alternate communication path, and (c) a second detector for detecting a failure in at least one of the second communication paths. A second controller of the second line node is preferably coupled to the second detector and the second switch. The second controller is responsive to the second detector outputting information indicating that a failure has been detected in at least one of the second communication paths for controlling the second switch to couple the second alternate communication path to a corresponding third link, thereby enabling a signal to be routed between the second link and that third link through the second alternate communication path.

Preferably, the first and second detectors detect failures in the first and second communication paths, respectively, by detecting a loss of light in those respective paths.

In accordance with another embodiment of the invention, at least one of the first and second controllers also responds to receiving the information from the first and second detector, respectively, by notifying the other controller of the failure detected by that detector. The other controller then responds by implementing the above-described switching operation in its respective line node.

According to one embodiment of the invention, a transponder is included in each of the first and second communication paths, and a transponder is included in each of the first and second alternate communication paths. The first and second controllers also respond to a detection of a failure by the first and second detector, respectively, by disabling the transponder included in the failed path.

In accordance with still another embodiment of this invention, a line node for providing 1:N protection for "protected" terminals is provided. In this embodiment the line node is coupled to 1) each of a plurality of first terminals through both a first link and a second link, and 2) at least one second terminal through at least one third link. Preferably, the line node comprises a plurality of communication paths for routing signals being communicated between the first terminals and the at least one second terminal. Each communication path has a first end coupled to a respective one of the first links and a second end coupled to the at least one third link. The line node preferably also comprises at least one switch having a plurality of first terminals and a second terminal. Each of the first terminals of the switch is coupled to a respective one of the second links, and the second terminal of the switch is coupled to the at least one third link.

A detector of the line node monitors for a failure in at least one of the line node communication paths, and provides an output to a controller of the line node in response to detecting a failure in the at least one path. The controller responds to receiving the detector output by controlling the switch to couple a corresponding one of the second links to the at least one third link, thereby providing an alternate route through those links. Also, the protected first terminal which is coupled to the failed communication path (through a corresponding first link) discontinues transceiving signals through its "working" interface, and resumes transceiving the signals through a "protection" interface of the terminal. As a result, communications between the protected first terminal and the at least one second terminal resume through the established alternate route.

In accordance with a further embodiment of this invention, a communications network is provided which includes both of the types of line nodes described above, and which provides network failure protection for both unprotected and protected terminals.

BRIEF DESCRIPTION OF THE DRAWINGS

The above set forth and other features of the invention are made more apparent in the ensuing Detailed Description of the Preferred Embodiments when read in conjunction with the attached drawings, wherein.

Identical portions of the various figures have been identified with the same reference numerals in order to simplify the description of the present invention. Components having similar purposes have been designated using the same reference numerals with a prime, double prime, or triple prime added.

DETAILED DESCRIPTION OF THE PREFERRED EMBODIMENTS

Figure 1:
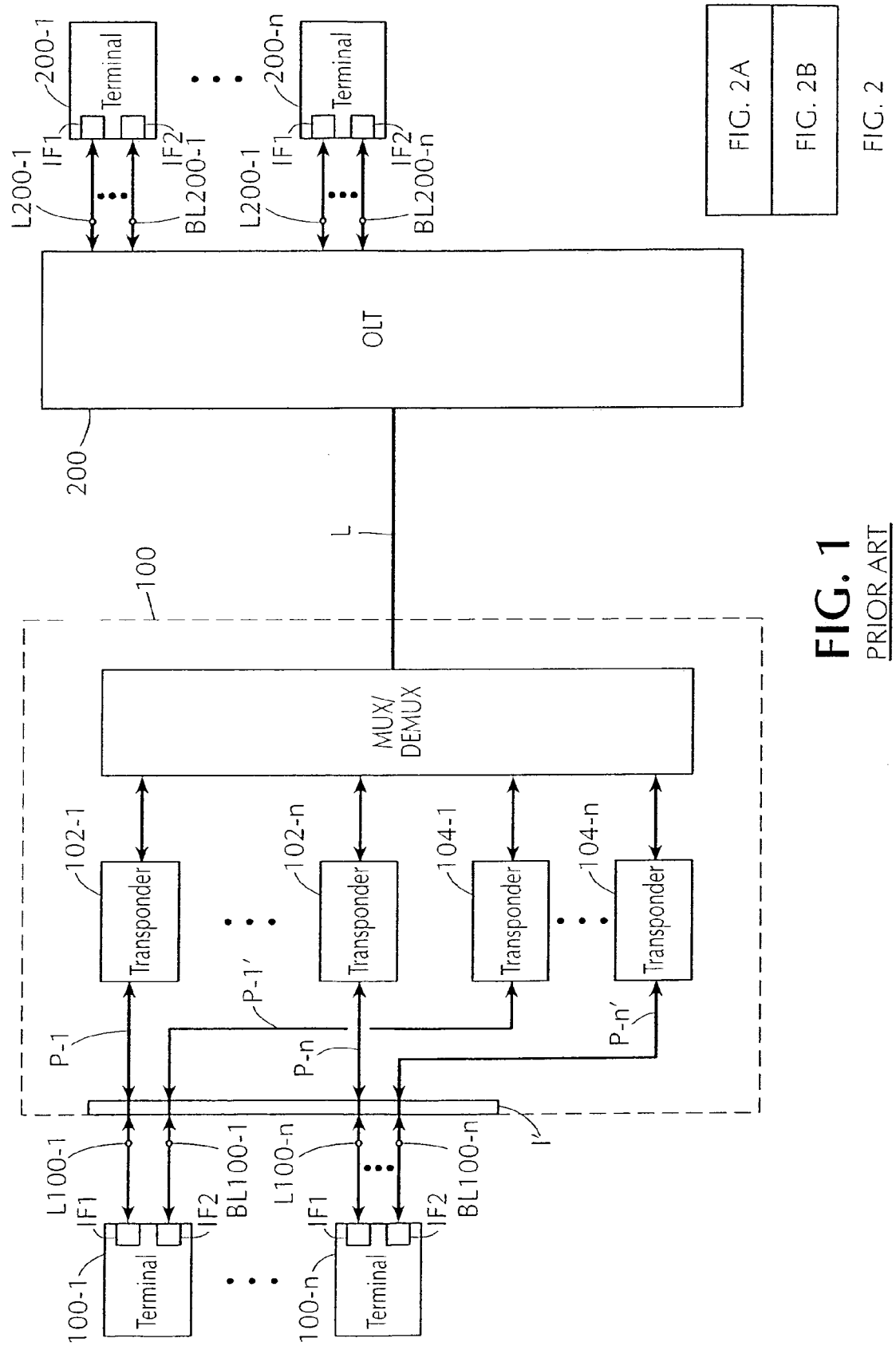
FIG. 1 shows a block diagram of an optical line terminal (OLT), or node, that is constructed in accordance with the prior art, and which is optically coupled to a plurality of terminals.
Figure 2A:
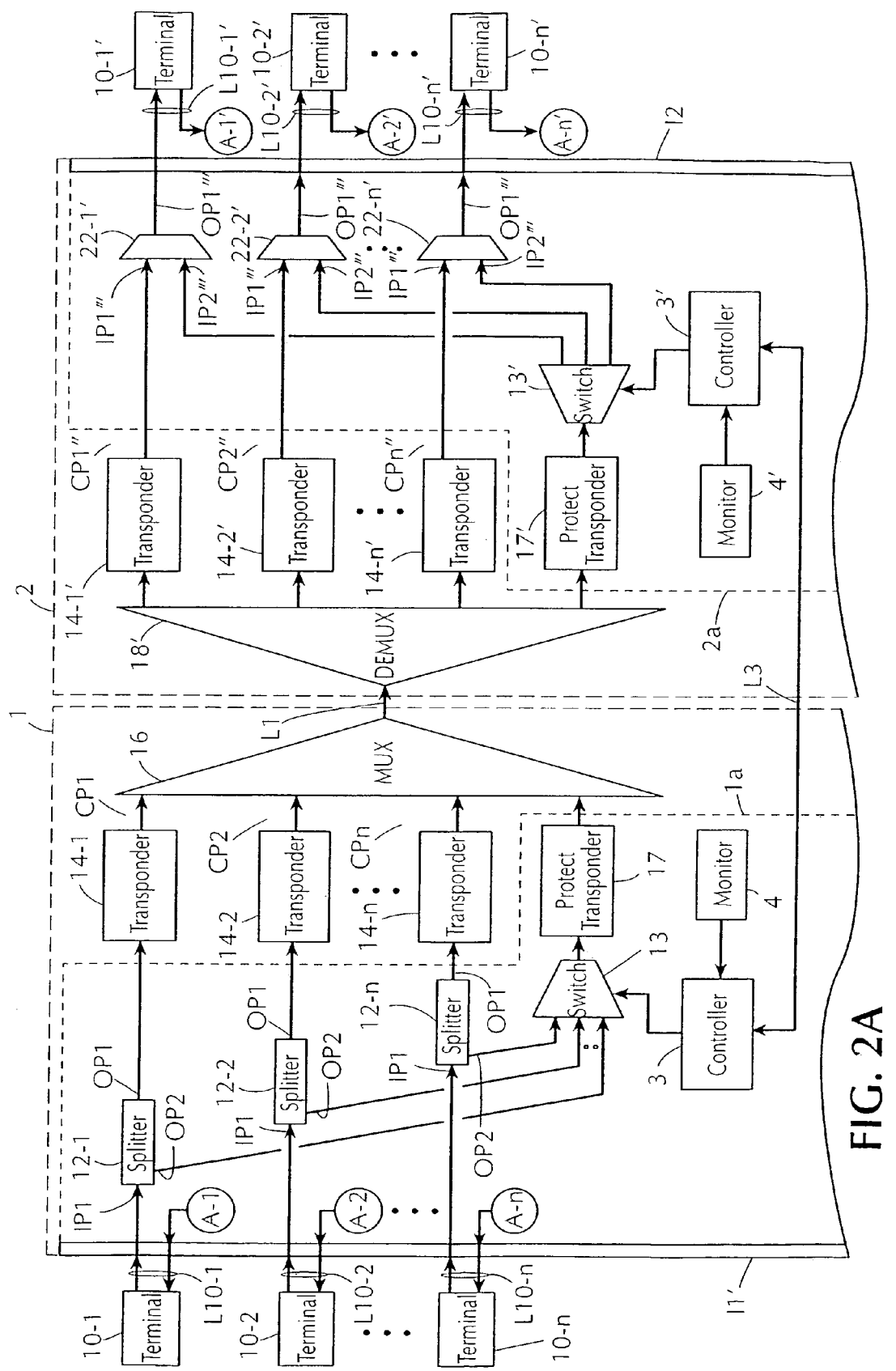
FIG. 2, consisting of FIGS. 2a and 2b, shows an optical communications network that includes terminals and nodes constructed and operated in accordance with an embodiment of this invention.
Figure 2B:
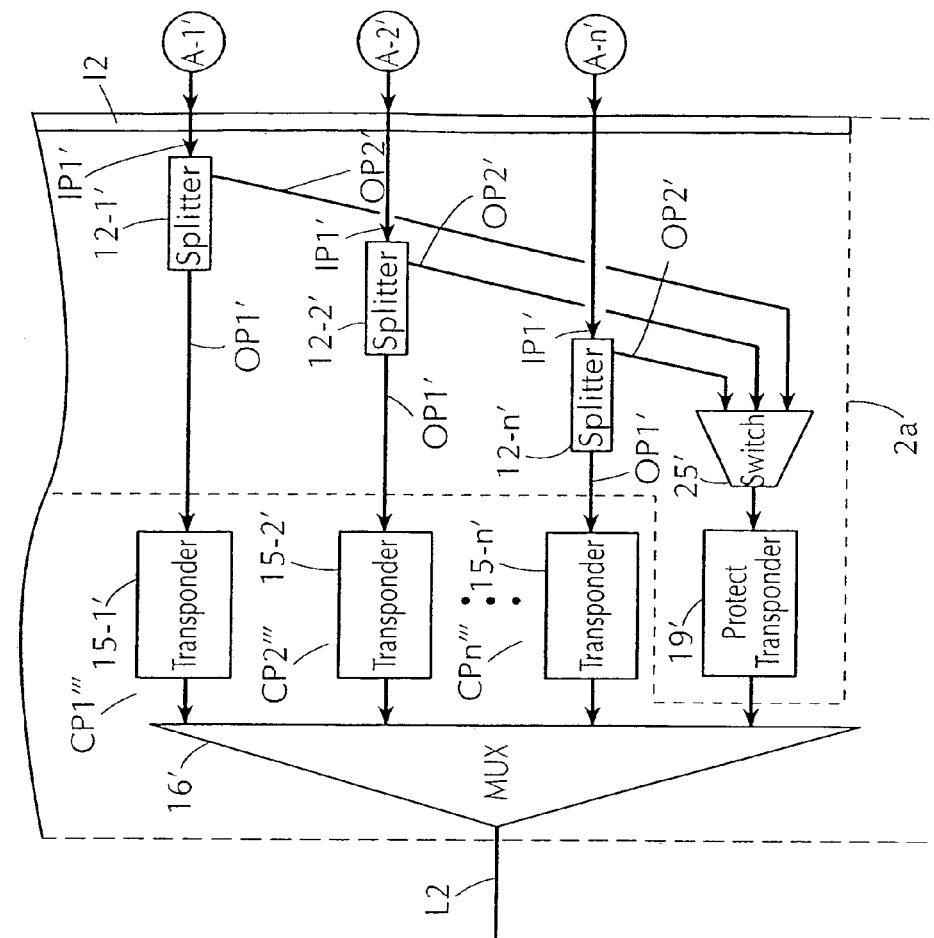
Figure 2B:
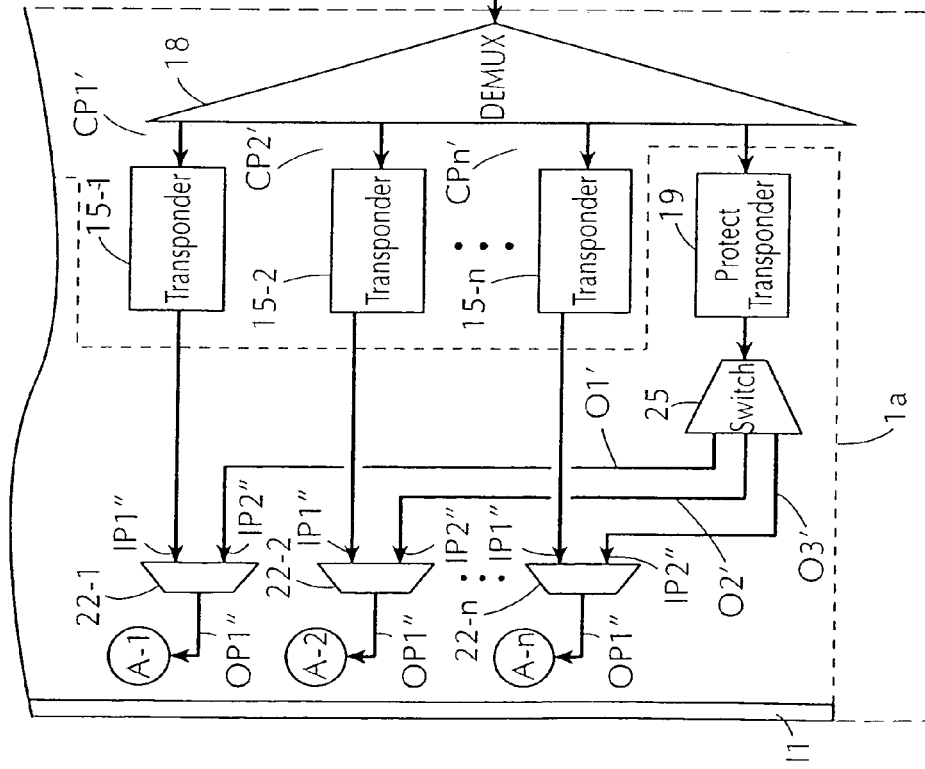

FIGS. 2a and 2b illustrate a block diagram of a plurality of nodes (also referred to as optical line terminals (OLTs)) 1 and 2 and terminals 10-1 to 10-n and 10-1' to 10-n' of an optical communications network that is suitable for practicing this invention. The network is depicted as a point-to-point communications network, although the invention is not limited to being employed only in such networks. For example, the invention may also be implemented in a mesh or point-to-multipoint (chain) communications network.

The nodes 1 and 2 are coupled together via transmission links L1, L2, and L3, each of which may include, for example, one or more optical fibers (e.g., two unidirectional fibers). In other embodiments of the invention, two or all three of the communication links L1, L2, and L3 may be combined into a single fiber link. The terminals 10-1 to 10-n are bidirectionally coupled to an interface I1 of the node 1 via "working" communication links L10-1 to L10-n, respectively, and the terminals 10-1' to 10-n' are bidirectionally coupled to an interface I2 of the node 2 via "working" communication links L10-1' to L10-n', respectively.

The terminals 10-1 to 10-n are assumed to have a capability for receiving signals (e.g., optical signals) from and transmitting signals to the node 1 by way of the links L10-1 to L10-n, respectively, and the terminals 10-1' to 10-n' are assumed to have a capability for receiving signals (e.g., optical signals) from and transmitting signals to the node 2 by way of the links L10-1' to L10-n', respectively. Each terminal 10-1 to 10-n and 10-1' to 10-n' is also assumed to lack the capability and/or interface equipment for automatically switching to backup or "protection" links in the event of a failure in one or more of the respective links L10-1 to L10-n and L10-1' to L10-n', and/or in the network communication paths coupled to those links. As was previously described, such terminals are known to those having skill in the art as "unprotected" terminals.

Each individual terminal 10-1- to 10-n and 10-1' to 10-n' may be, for example, a node operating in accordance with the Asynchronous Transfer Mode (ATM) or the Internet Protocol (IP) (e.g., an ATM switch or IP router), or a node of the Synchronous Optical Network (SONET). It should be noted, however, that the present invention, broadly construed, is not limited to any one particular type of communication protocol, standard, or network.

The node 1 preferably comprises a plurality of "working" communication paths CP1-CPn (channels) interposed between the interface I1 and a multiplexer 16 of the node 1, and another plurality of "working" communication paths CP1'-CPn' interposed between the interface I1 and a demultiplexer 18 of the node 1. Preferably, splitters 12-1 to 12-n and transponders (e.g., port cards) 14-1 to 14-n are included in the communication paths CP1-CPn, respectively. As shown in FIG. 2a, an input IP1 and an output OP1 of the individual splitters 14-1 to 14-n are both coupled in the respective paths CP1-CPn. The communication paths CP1'-CPn' of FIG. 2b preferably include transponders 15-1 to 15-n, respectively, and switches 22-1 to 22-n, respectively, although in other embodiments the transponders 15-1 to 15-n need not be included in those paths CP1'-CPn'. Each switch 22-1 to 22-n has an input IP1" that is coupled at an end of a respective one of the paths CP1'-CPn', and an output OP1" that is coupled to a respective one of the terminals 10-1 to 10-n through a respective link L10-1 to L10-n.

The node 2 also preferably comprises a plurality of "working" communication paths CP1"-CPn" (channels) interposed between a demultiplexer 18' and the interface I2 of the node 2 (FIG. 2a), and another plurality of "working" communication paths CP1'''-CPn''' interposed between a multiplexer 16' and the interface I2 of the node 2 (FIG. 2b). The communication paths CP1"-CPn" preferably include transponders 14-1' to 14-n', respectively, and switches 22-1' to 22-n', respectively, although in other embodiments the transponders 14-1' to 14-n' need not be included in those paths CP1"-CPn". Each switch 22-1' to 22-n' has an input IP1" that is coupled at an end of a respective one of the paths CP1"-CPn", and an output OP1'" that is coupled to a respective one of the terminals 10-1' to 10-n' through a respective link L10-1' to L10-n'. Preferably, splitters 12-1' to 12-n' and transponders (e.g., port cards) 15-1' to 15-n' are included in the communication paths CP1'''-CPn''', respectively, wherein an input IP1' and an output OP1' of the individual splitters 15-1' to 15-n' is coupled in the respective paths CP1-'''CPn''', as shown in FIG. 2b.

In accordance with an aspect of this invention, the nodes 1 and 2 comprise protection modules 1a and 2a, respectively, that are employed to provide backup (i.e., "protection") communication paths for routing signals between the terminals 10-1 to 10-n and 10-1' to 10-n' in the event that a failure occurs in a "working" communication path CP1-CPn, CP1'-CPn', CP1"-CPn", CP1-'"-CPn1", as will be described further below. In accordance with a presently preferred embodiment of the invention, the protection module 1a comprises the splitters 12-1 to 12-n, the switches 22-1 to 22-n (FIG. 2b), 1×N optical switches 13 and 25, "protection" transponders 17 and 19, a local controller 3, and a monitor block 4. Similarly, the protection module 2a preferably comprises the splitters 12-1' to 12-n' (FIG. 2b), the optical switches 22-1' to 22-n', 1×N optical switches 13' and 25', "protection" transponders 17' and 19', a local controller 3', and a monitor block 4'.

Preferably, the switches 22-1 to 22-n and 22-1' to 22-n' are each 1×2 optical switches, although in other embodiments, optical splitters may be employed in lieu of those switches, and/or other suitable types of multiple position switches may be employed in place of two or more of the 1×2 switches. Also, in other embodiments the multiplexer 16 and demultiplexer 18 of node 1 may be embodied as a single multiplexer/demultiplexer (MUX/DEMUX), and the multiplexer 16' and demultiplexer 18' of node 2 also may be embodied as a single MUX/DEMUX, rather than as separate devices as depicted in FIGS. 2a and 2b, and each transponder 14-1 to 14-n, 14-1' to 14-n', in combination with a corresponding one of the transponders 15-1 to 15-n, 15-1' to 15-n', may represent a portion of a bidirectional transponder. Preferably, the multiplexers 16 and 16' and demultiplexers 18 and 18' are Wavelength-Division Multiplex (WDM) devices.

The manner in which the various components of the nodes 1 and 2 operate will now be described, beginning with those depicted in FIG. 2a. The monitor blocks 4 and 4' monitor the communication paths CP1-CPn, CP1'-CPn' and CP1"-CPn", CP1'''-CPn''', respectively, for the presence or absence of light in those paths, and notify the respective controllers 3 and 3' of whether or not light has been detected in those paths. A detection revealing that light is absent in a communication path is indicative of a failure in the path or a failure in a path coupled thereto. For example, light may be absent in the communication path as a result of a failure of a corresponding transponder 14-1 to 14-n, 14-1' to 14-n', 15-1 to 15-n, 15-1' to 15-n'. Light also may be absent in a communication path as a result of other failure-causing events, such as, for example, a transceiver and/or "working" interface failure in a corresponding terminal 10-1 to 10-n and 10-1' to 10-n', a failure of a link L10-1 to L10-n and L10-1' to L10-n', a failure of a node fiber disconnect or optical amplifier (not shown), etc. The present embodiment of the invention protects primarily against failures occurring in 1) portions of the communication paths CP1-CPn interposed between the splitters 12-1 to 12-n and multiplexer 16, 2) portions of the communication paths CP1'-CPn' interposed between the switches 22-1 to 22-n and demultiplexer 18, 3) portions of the communication paths CP1"-CPn" interposed between the demultiplexer 18' and the switches 22-1' to 22-n', and 4) portions of the communication paths CP1'''-CPn''' interposed between the multiplexer 16' and the splitters 12-1' to 12-n', respectively.

The monitor blocks 4 and 4' each may be embodied as one or more optical sensors, such as a photodiode, although, for convenience, only the two monitor blocks 4 and 4' are shown in FIG. 2a. In an exemplary embodiment, each communication path CP1-CPn, CP1'-CPn', CP1"-CPn", and CP1'''-CPn1''' may have its own dedicated optical sensor(s) for detecting the presence or absence of light in the path. For example, the sensors may be integral parts of the transponders 14-1 to 14-n, 15-1 to 15-n, 14-1' to 14-n', and 15-1' to 15-n' in the respective paths CP1-CPn, CP1'-CPn', CP1"-CPn", and CP1'''-CPn''', or may be tapped into a selected point in the paths adjacent to the transponders (although this also is not shown for convenience).

The controllers 3 and 3' function to coordinate the exchange of signals between the nodes 1 and 2 and the exchange of signals between the nodes 1 and 2 and the terminals 10-1 to 10-n and 10-1' and 10-n', respectively, in the event that a failure is detected in a communication path by a monitor block 4 or 4'. The controllers 3 and 3' are coupled to the switches 13 and 13', respectively, and, although not shown in FIGS. 2a and 2b, are also coupled to the switches 25, 22-1 to 22-n and 25', 22-1' to 22-n', respectively. The controllers 3 and 3' control the configurations (i.e., positions) of those respective switches in response to receiving either a failure notification signal from monitor block 4 or 4', respectively, or a failure notification signal from the other controller. The controllers 3 and 3' are bidirectionally coupled together through communication link L3, for communicating with one another (e.g., over an optical supervisory channel). The manner in which the controllers 3 and 3' control the various switches 13, 13', 25, 25', 22-1 to 22-n, and 22-1' to 22-n' to coordinate signal exchanges within the network in the event that a failure is detected will be described below.

The splitters 12-1 to 12-n of node 1 are preferably passive splitters, and split signals received from the respective terminals 10-1 to 10-n (over respective links L10-1 to L10-n) into two corresponding signal portions, one of which is forwarded through splitter output OP1 to a corresponding transponder 14-1 to 14n, and the other of which is forwarded through splitter output OP2 to a corresponding input of the switch 13. In response to receiving a signal portion from a corresponding splitter 12-1 to 12-n, each transponder 14-1 to 14-n operates in a known manner for outputting to the multiplexer 16 a corresponding signal having a predetermined one of a plurality of available wavelengths. Similarly, the transponder 17 responds to receiving a signal output from the switch 13; by outputting a corresponding signal having a predetermined wavelength to the multiplexer 16.

As was previously described, the multiplexer 16 is preferably a WDM multiplexer, and operates in a known manner for coupling different wavelength signals received from the respective transponders 14-1- to 14-n and 17 onto the transmission link L1 for transmission to the node 2. Within the node 2, signals received from the transmission link L1 are applied to the demultiplexer 18', which, in turn, demultiplexes the received signals and outputs corresponding signals, each having a predetermined wavelength, to corresponding ones of the transponders 14-1' to 14-n' and 17'. The transponders 14-1' to 14-n' and 17' operate in a similar manner as the transponders 14-1 to 14-n and 17 of node 1 described above, and each respond to receiving a signal from the demultiplexer 18' by outputting a signal having a corresponding predetermined wavelength to the switches 22-1' to 22-n' and 13', respectively.

Having described the various components of the nodes 1 and 2 depicted in FIG. 2a, the components of those nodes shown in FIG. 2b will now be described. The node components depicted in FIG. 2b are employed for forwarding communications originating from the terminals 10-1' to 10-n' to corresponding ones of the terminals 10-1 to 10-n. Referring to both FIGS. 2a and 2b, output links of the terminals 10-1' to 10-n' are coupled (through connectors A-1' to A-n', respectively) to the input IP1' of respective ones of the splitters 12-1' to 12-n' (FIG. 2b). Like the splitters-12-1 to 12-n of node 1, the splitters 12-1' to 12-n' of node 2 are preferably passive splitters, and each split received signals into two corresponding portions, one of which is forwarded through splitter output OP1' to a corresponding transponder 15-1' to 15-n', and the other of which is forwarded through splitter output OP2' to a corresponding input of the switch 25'.

Each of the transponders 15-1' to 15-n' and 19' is responsive to receiving a signal for outputting a corresponding signal having a predetermined wavelength to the multiplexer 16', which, in turn, multiplexes those output signals onto the transmission link L2 for transmission to the node 1. The demultiplexer 18 of node 1 operates in a similar manner as the demultiplexer 18' described above, and demultiplexes signals received from the transmission link L2 and outputs signals, each having a predetermined wavelength, to corresponding ones of the transponders 15-1 to 15-n and 19. Each transponder 15-1 to 15-n and 19 responds to receiving a respective one of those signals by outputting a signal having a corresponding predetermined wavelength to a corresponding one of the switches-22-1 to 22-n and 25.

Figure 4A:
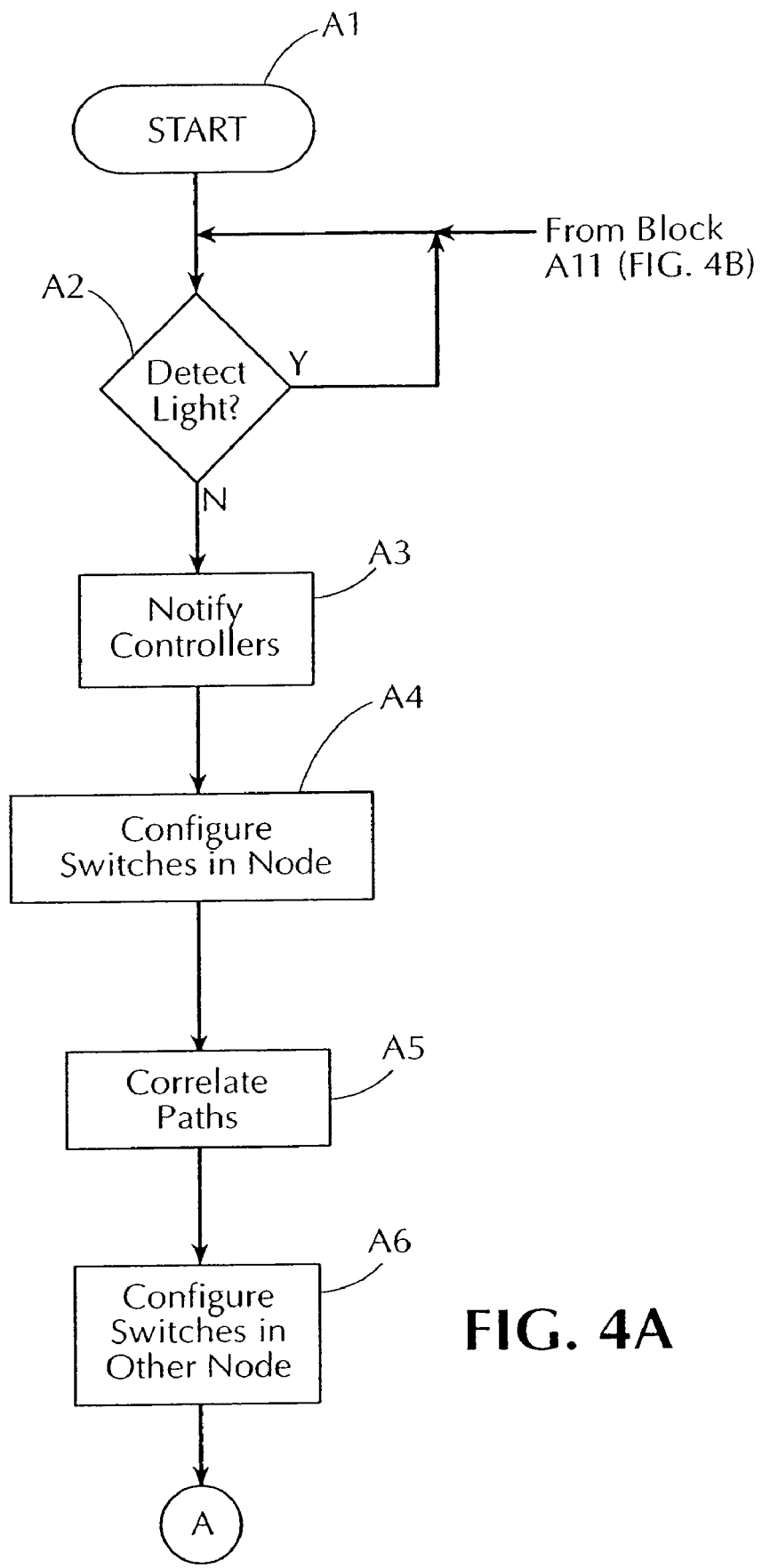
FIGS. 4a and 4b are a logical flow diagram depicting a method in accordance with one embodiment of this invention.

Referring to the flow diagram of FIGS. 4a and 4b, a method in accordance with an embodiment of this invention will now be described. At block A1, the method is started, and it is assumed that the nodes 1 and 2 are operating in a normal operating mode wherein all of the node communication paths CP1-CPn, CP1'-CPn', CP1"-CPn", CP1'''-CPn''' and are functioning properly. During this operating mode, light is detected on each of those node communication paths by the monitor blocks 4 and 4' ('y' at block A2), and, as a result, the controller 3' maintains the switches 22-1' to 22-n' in a configuration for coupling outputs of the respective transponders 14-1' to 14-n' to the terminals 10-1' to 10-n', respectively, and the controller 3 maintains the switches 22-1 to 22-n in a configuration for coupling outputs of the respective transponders 15-1 to 15-n to the terminals 10-1 to 10-n, respectively. It is also assumed that signals are being provided from terminal 10-1 to terminal 10-1' by way of the communication path CP1 of node 1, the transmission link L1, and the communication path CP1" of node 2.

At some time later, it is assumed that the transponder 14-1' of communication path CP1" fails, and that the monitor block 4' detects the failure in that path CP1" ('N' at block A2). In response to detecting the failure in the path CP1", the monitor block 4' notifies the controller 3' that a failure has occurred in the path CP1" (block A3). The controller 3' then responds by 1) providing a failure signal to the controller 3 indicating that a failure has been detected in the path CP1", 2) configuring the switch 13' to cause the switch 13' to couple the output of protection transponder 17' to an input IP2'" of switch 22-1', and 3) configuring the switch 22-1' to couple that input IP2'" to terminal 10-1', via link L10-1' (block A4).

The controller 3 responds to receiving the failure signal from the controller 3' by correlating the failed communication path CP1" to a corresponding "working" communication path (e.g., CP1) from node 1 (block A5). For example, the controller 3 may perform this correlation operation by correlating information (received from controller 3') identifying the failed path CP1" with corresponding, pre-stored information relating to corresponding path CP1 from node 1, although in other embodiments, other suitable correlation techniques may also be employed. After block A5, the controller 3 configures the switch 13 to cause output OP2 of the splitter 12-1 from the path CP1 determined at block A5, to an input of the transponder 17 (block A6).

Figure 4B:
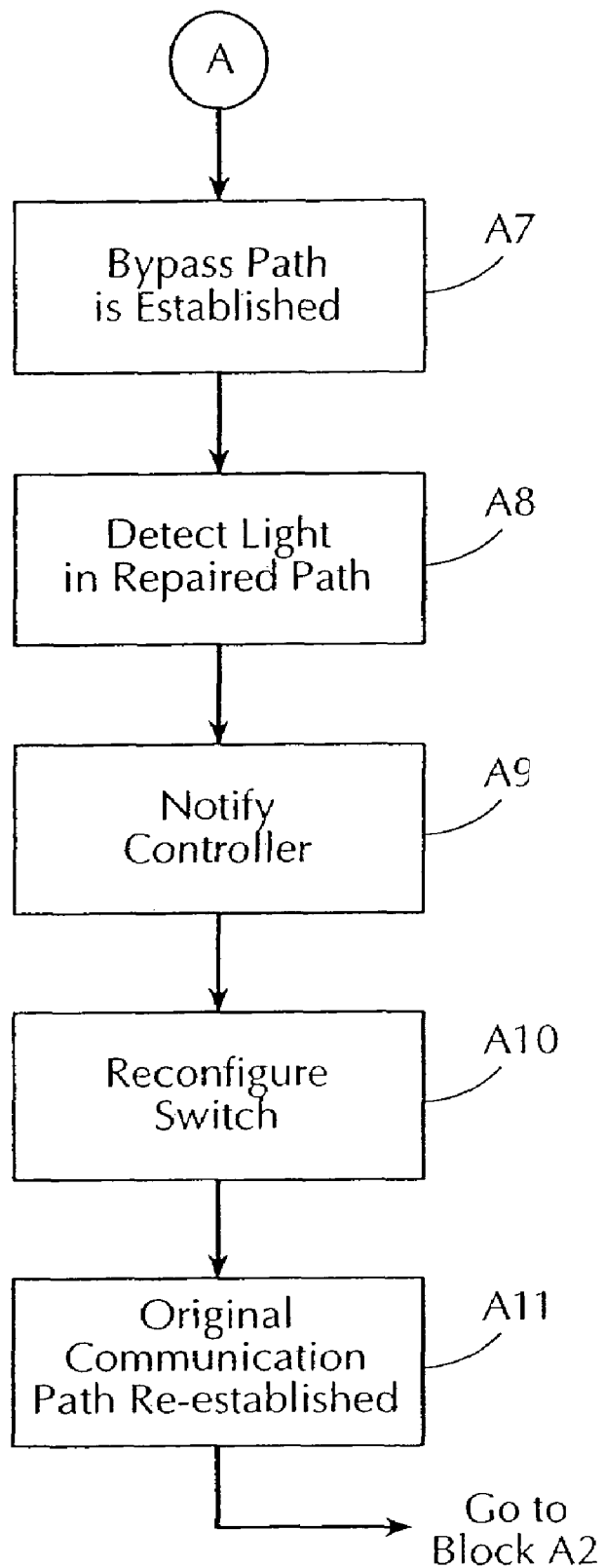

As a result of the switching operations performed at blocks A4 and A6, the failed communication path CP1" is bypassed, and a backup communication path is established which forwards signals originating from terminal 10-1, to the terminal 10-1' (block A7, FIG. 4b). The established backup communication path in this example includes the splitter 12-1 (e.g., the splitter portion from input IP1 to output OP2), the switch 13, the transponder 17, and the multiplexer 16 of node 1, as well as the transmission link L1, and the demultiplexer 18', transponder 17', switch 13', and switch 22-1' of node 2. Preferably, the switching operations of blocks A4 and A5 are performed in a manner which minimizes the amount of signal traffic lost as a result of the failure in the communication path CP1".

At some time after the backup communication path is established, it is assumed that the communication path CP1" which failed at block A2 is repaired, and that, as a result, light is detected again in that path by the monitor block 4' (block A8). In response to detecting the presence of the light in the path CP1", the monitor block 4' notifies the controller 3' (block A9), which then responds by reconfiguring the switch 22-1' to cause the output of transponder 14-1' to be coupled again to the terminal 10-1', via link L10-1' (block A10). As a result, signals originating from the terminal 10-1 are routed again to the terminal 10-1' by way of the communication path CP1 of node 1, the transmission link L1, and the repaired communication path CP1" of node 2 (block A11). Control then passes back to Block A2 where the method continues in the manner described above.

It should be appreciated in the view of the foregoing description that the switching configurations implemented in the nodes 1 and 2 in the above example are also implemented in cases in which, for example, a failure is detected in the communication path CP1. As but one example, it is assumed that a failure occurs in the communication path CP1, but the monitor block 4 does not detect a loss of light in the path CP1 (owing to, e.g., the failure occurring at a point in the path CP1 after the monitored point and/or a failure in the block 4). It is also assumed that the failure in communication path CP1 is detected as a loss of light in the corresponding communication path CP1" of node 2 by the monitor block 4'. In this case, the controller 3' responds to the failure detection by configuring the switches 13' and 22-1' of node 2 in the above-described manner (see, e.g., block A4), and by notifying the controller 3 of node 1 of the detected failure. The controller 3 responds to receiving the notification by the performing operations of blocks A5 and A6 described above to configure the switch 13 in the above-described manner for establishing the alternate communication path.

As also can be appreciated in the view of the foregoing description, in the event that a failure is detected in another other one of the communication paths CP1-CPn, CP1'-CPn', CP1"-CPn", and CP1'"-CPn'", another suitable switching configuration is implemented by the controllers 3 and 3' for bypassing the failed path. For example, in a case where a failure is detected in communication path CPn' depicted in FIG. 2b, the switches 25', 25, and 22-n' are configured to provide an alternate communication path for routing signals received from terminal 10-n', to terminal 10-n.

It should be noted that although the foregoing method of the invention is described in the context of one controller 3 or 3' notifying the other controller when a failure is detected in a communication path, each individual controller 3 and 3' may also make such a determination independently. For example, a failure in communication path CP1 of node 1 may be detected as a loss of light in both that path (by the monitor block 4) and corresponding communication path CP1" of node 2 (by monitor block 4'), and the appropriate switching operations may be implemented in those nodes separately to establish the backup communication path. It should further be noted that although the above-described embodiment has been described in the context of providing protection for unprotected terminals, it is also within the scope of this invention to employ that embodiment for providing protection for protected terminals as well. For example, the components of modules 1a and 2a may be included in backup communication paths (described below) of nodes coupled to unprotected terminals, for providing redundant backup protection.

Another aspect of the invention will now be described. In accordance with this aspect of the invention, failure protection is provided within nodes of a communication network for so called "protected" terminals. As was described above, "protected" terminals are known to those skilled in the art as being equipped with "protection" interface equipment.

Figure 3:
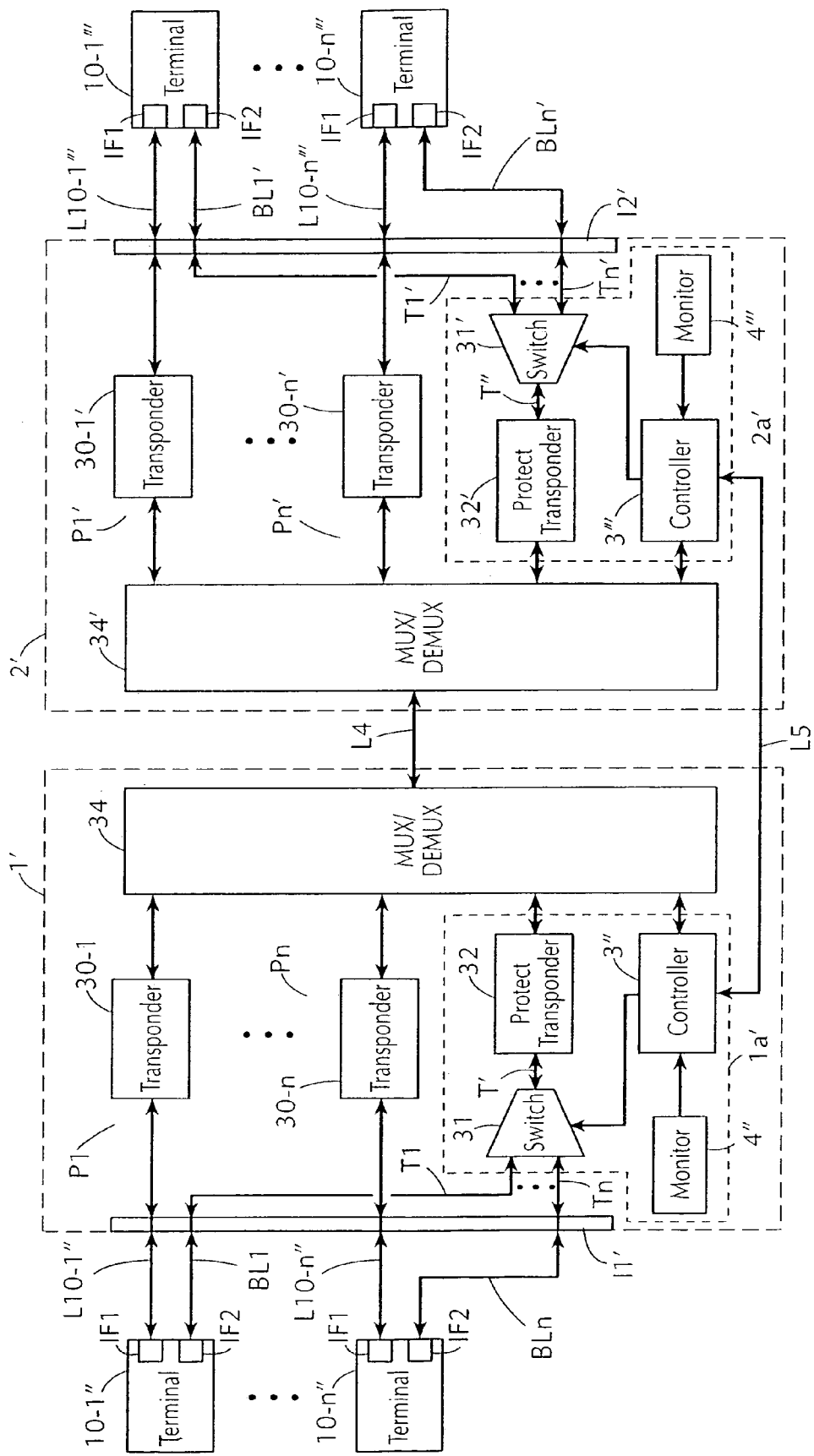
FIG. 3 shows an optical communications network that includes terminals and nodes constructed and operated in accordance with another embodiment of this invention.

Referring to FIG. 3, a block diagram is shown of nodes 1' and 2' and "protected" terminals 10-1" to 10-n " and 10-1'" to 10-n'" of an optical communications network that is suitable for practicing this aspect of the invention. The nodes 1' and 2' are bidirectionally coupled to one another through a bidirectional transmission link L4. Bidirectional "working" communication links L10-1" to L10-n " couple "working" interfaces (IF1) of the terminals 10-1" to 10-n ", respectively, to an interface I1'of the node 1', and bidirectional "protection" communication links BL1-BLn couple "protection" interfaces (IF2) of those terminals 10-1" to 10-n ", respectively, to the interface I1'. Similarly, bidirectional "working" communication links L10-1'" to L10-n'" couple "working" interfaces (IF1) of the terminals 10-1'" to 10-n'", respectively, to an interface I2' of the node 2', and bidirectional "protection" communication links BL1'-BLn' couple "protection" interfaces (IF2) of the terminals 10-1'" to 10-n'", respectively, to the interface I2'.

The node 1' comprises a plurality of "working" bidirectional communication paths P1-Pn that are interposed between interface I1' and a multiplexer/demultiplexer (MUX/DEMUX) 34 of the node 1', and the node 2' comprises a plurality of bidirectional "working" communication paths P1'-Pn' that are interposed between a multiplexer/demultiplexer (MUX/DEMUX) 34' of node 2' and interface I2' of the node 2'. Bidirectional transponders 30-1 to 30-n are included in the communication paths P1-Pn, respectively, of node 1', and bidirectional transponders 30-1' to 30-n' are included in the communication paths P1'-Pn', respectively, of the node 2'.

In accordance with an aspect of this invention, the nodes 1' and 2' also comprises protection modules 1a' and 2a', respectively. The protection module 1a' preferably comprises a monitor block 4", a controller 3", a bidirectional 1×N switch 31 having terminals T1-Tn that are coupled through interface I1' to respective ones of the protection communication links BL1-BLh, and a bidirectional "protection" transponder 32 that is interposed between another terminal T' of the switch 31 and the MUX/DEMUX 34. Similarly, the protection module 2a' preferably comprises a monitor block 4'", a controller 3'", a bidirectional 1×N switch 31' having terminals T1'-Tn' that are coupled through the interface I2' to respective ones of the protection communication links BL1'-BLn', and a bidirectional "protection" transponder 32' that is interposed between another terminal T" of the switch 31' and the MUX/DEMUX 34'. The controllers 3" and 3'" are bidirectionally coupled to one another by way of a communication link L5, although in other embodiments, the controllers 3" and 3'" may communicate with one another through the link L4.

The controllers 3" and 3'" and monitor blocks 4" and 4'" are similar to those described above, and will not be described in further detail. The transponders 30-1 to 30-n, 32, 30-1' to 30-n', and 32' each are responsive to receiving a signal for outputting a corresponding signal having a predetermined wavelength.

The MUX/DEMUX 34 is preferably a WDM device, and operates in a known manner for coupling signals having respective wavelengths from the respective transponders 30-1 to 30-n and 32 onto the transmission link L4 for transmission to the node 2'. The MUX/DEMUX 34 also demultiplexes signals received from the link L4 and outputs signals, each having a predetermined wavelength, to corresponding ones of the transponders 30-1 to 30-n and 32. Preferably, the MUX/DEMUX 34' also is a WDM device, and operates by coupling signals having respective frequencies, received from the respective transponders 30-1' to 30-n' and 32', onto the transmission link L4 for transmission to the node 1', and by demultiplexing signals received from the link L4 for outputting corresponding signals, each having a predetermined wavelength, to corresponding ones of the transponders 30-1' to 30-n' and 32'.

The switches 31 and 31' are controllable by the controllers 3" and 3'", respectively, for being placed in a particular configuration for providing a backup communication path in the event that a communication path failure is detected by monitor block 4" and/or 4'", respectively, as will be further described below. It should be noted that, although for simplicity the various components L10-1" to L10-n ", L10-1'" to L10-1'", BL1-BLn, BL1'-BLn', P1-Pn, P1'-Pn', 31, 31', 32, 32', 30-1 to 30-n, 30-1' to 30-n', L4, and L5 of FIG. 3 are described herein in the context of being bidirectional, in other, preferred embodiments, corresponding unidirectional components may be employed instead. For example, two or more unidirectional links may be employed for each link L4, L5, L10-1" to L10-n ", L10-1'" to L10-1'", BL1-BLn, and BL1'-BLn', two or more unidirectional transponders may be employed in lieu of each transponder 31, 31', 32, 32', 30-1 to 30-n, 30-1' to 30-n', each path P1-Pn, P1'-Pn' may include two or more unidirectional paths, two or more 1×N switches may be employed in lieu of each switch 31 and 31', and a separate multiplexer and demultiplexer may be employed in lieu of each MUX/DEMUX 34, 34'. For these embodiments, the manner in which such unidirectional components would be interconnected within the overall system would be readily appreciated by one skilled in the art, in view of this description.

Figure 5A:
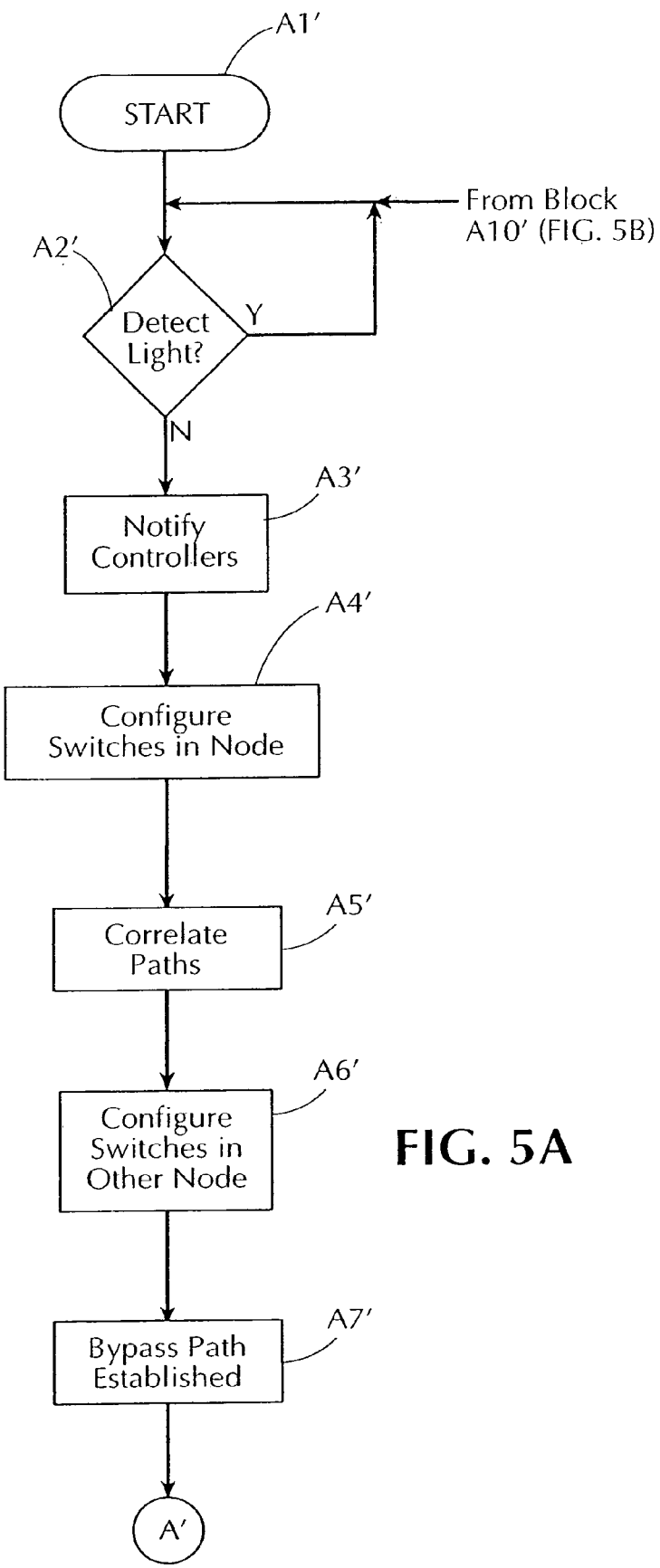
FIGS. 5a and 5b are a logical flow diagram depicting a method in accordance with another embodiment of this invention.
Figure 5B:
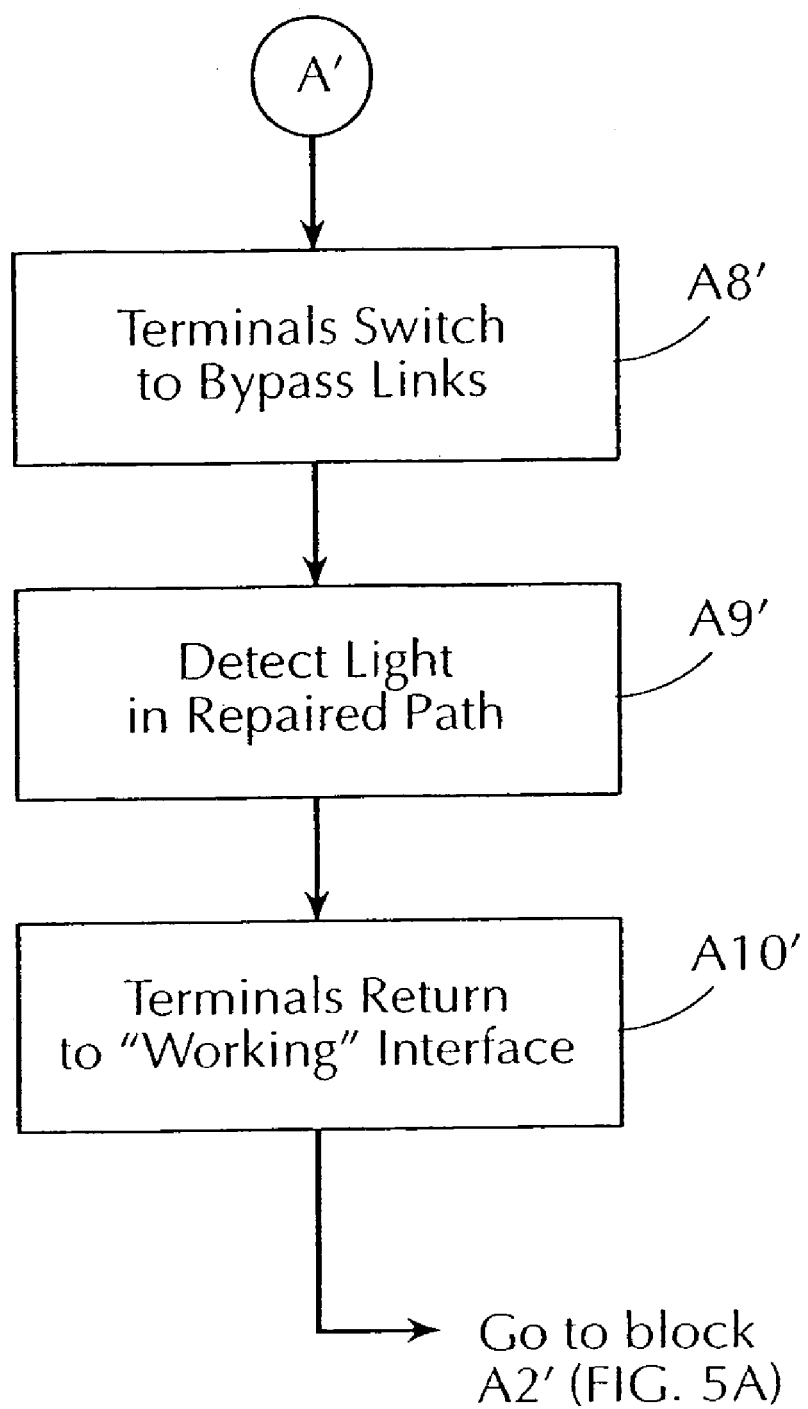

Referring to the flow diagram of FIGS. 5a and 5b, a method in accordance with this aspect of the invention will now be described. At block A1', the method is started, and it is assumed that the terminals 10-1" to 10-n " and 10-1'" to 10-n'" are employing their "working" interfaces for communicating, through nodes 1' and 2', link L4, and the links L10-1" to L10-n " and L10-1'" to L10-n'", respectively.

At block A2' it is assumed that one of the monitor blocks 4 or 4' detects a loss of light in one of the paths P1-Pn or P1'-Pn', respectively ('N' at block A2'). For example, the loss of light in the path may be a result of a failure of a corresponding transponder 30-1 to 30-n or 30-1' to 30-n', a failure of a "working" transceiver and/or interface (IF1) of a corresponding transmitting terminal, a failure of a "working" link coupled to a transmitting terminal, respectively, and/or a failure of a node fiber disconnect or optical amplifier (not shown) in the path, etc. For the purposes of this description, it is assumed that the "working" interface (IF1) of terminal 10-1" fails and that, as a result, the monitor block 4" detects the absence of light in the communication path P1.

In response to detecting the absence of light in the path P1, the monitor block 4" notifies the controller 3" that a failure has occurred in the path P1 (block A3'). The controller 3" then responds by 1) providing a failure signal to the controller 3'" to notify the controller 3'" of the failure in the path P1, and 2) configuring the switch 31 to cause the switch 31 to couple the protection link BL1 to the "protection" transponder 32, through interface I1' (block A4'). The controller 3'" responds to receiving the failure signal from the controller 3" by correlating the failed communication path P1 to corresponding "working" communication path P1' of node 2, in the manner described above (block A5'), and by thereafter configuring the switch 31' to cause the output of transponder 32' to be coupled to the protection link BL1', through interface I2' and switch 31' (block A6').

As a result of the switching operations performed at blocks A4' and A6', an alternate (backup) communication path is established between the terminals 10-1" and 10-1'" for bypassing the failed "working" interface (IF1) of terminal 10-1" (block A7'). The alternate communication path includes, in this example, link BL1, switch 31, transponder 32, MUX/DEMUX 34, link L4, MUX/DEMUX 34', transponder 32', switch 31', and the link BL1'.

At block A8', it is assumed that the terminals 10-1" and ~10-1'" each recognize that the alternate communication path has been established (i.e., is active), and respond by switching to their protection interfaces (IF2) for resuming communications with one another through the alternate communication path established at block A7'. For example, the terminals 10-1" and 10-1'" may recognize that the alternate communication path has been established in response to detecting light and/or a communication signal received from the (now active) protection links BL1 and BL1', respectively, or by some other known technique.

At some later time, it is assumed that 1) the failure which occurred at block A2' is repaired (e.g., the "working" interface (IF1) of terminal 10-1" is repaired and becomes operable again) (block A9'), and 2) this is recognized by the terminals 10-1" and 10-1'", using a known technique as described above (e.g., the terminals 10-1" and 10-1'" may detect light and/or a communication signal received from the protection links BL1 and BL1'). The terminals 10-1" and 10-1'" then respond in a known manner by switching to their "working" interfaces (IF1), for resuming communications with one another through those interfaces (IF1), "working" links L10-1" and L10-1'", communication path P1, and communication path P1' (block A10'). Control then passes back to block A2' where the method continues in the manner described above.

In view of the foregoing description, it can be appreciated that the nodes 1' and 2' provide 1:N protection for the protected terminals coupled to those nodes, using a lesser number of components (e.g., transponders and links) than are employed in the prior art nodes 100 and 200 described above.

A further aspect of the invention will now be described, with reference being made to FIG. 6, which is a block diagram of nodes 1" and 2", unprotected terminals 10-1 and 10-1', and protected terminals 10-1" and 10-1''', of an optical communications network that is suitable for practicing this aspect of the invention. In accordance with this aspect of the invention, the nodes 1" and 2" have a capability for providing backup protection for both the protected and unprotected terminals.

The network includes similar components 10-1, 10-1', 10-1", and 10-1''', 12-1, 12-1', 30-1, 30-1', 30-1", 30-1''', 32, 32', 31, 31', 22-1, 22-1', 34, 34', L4, L5, I1', I2'-311, 3''', 4", and 4''', as those described above, and thus those components will not be described in further detail. In accordance with a preferred embodiment of the invention, the nodes 1" and 2" also comprise switches 31a and 31a', respectively. Preferably, a first input T1a of the switch 31a is coupled to an output OP2 of splitter 12-1, a second input T2a of the switch 31a is coupled to an output of terminal 10-1" through the interface I1' and a "protection" link BL-1", and an output Ta' of the switch-31a is coupled to an input of "protection" transponder 32. Similarly, a first input T1a' of switch 31a' is preferably coupled to an output OP2' of splitter 12-1', a second input T2a' of the switch 31a' is preferably coupled to an output protection interface IF2 of terminal 10-1''' through the interface I2' and "protection" link BL-1''', and an output Ta'' of the switch 31a' is preferably coupled to an input of "protection" transponder 32'.

Also in the preferred embodiment of the invention, an input T' of switch 31 is coupled to an output of the transponder 32, a first output T' of the switch 31 is coupled to a first input IP1" of switch 22-1, and a second output T2' of the switch 31 is coupled to a protection interface IF2 of terminal 10-1" through the node interface I1' and protection link BL-1a". Similarly, an input T" of switch 31' of node 2" is coupled to an output of transponder 32', a first output T1" of the switch 31' is coupled to a first input IP1''' of switch 22-1', and a second output T2''' of the switch 31' is coupled to a protection interface IF2 of terminal 10-1''' through the interface I2' and a protection link BL-1a'''. Also, an output OP1" of the switch 22-1 of node 1" is coupled to an input of terminal 10-1 through the interface I1' and a link L10-1b, a second input IP2" of switch 22-1 is coupled to an output of the transponder 30-1, and, as was previously described, the first input IP1" of the switch 22-1 is coupled to the first output T1' of switch 31. Likewise, an output OP1''' of switch 22-1' of node 2" is coupled to an input of terminal 10-1' through the interface I2' and a link L10-1b', a second input IP2''' of switch 22-1' is coupled to an output of the transponder 30-1', and, as was previously described, the first input IP1''' of the switch 22-1' is coupled to the first output T1" of switch 31'. Also shown in FIG. 6 is a link L10-1a, which couples an output of terminal 10-1 to splitter 12-1 through interface I1', a link L10-1", which bidirectionally couples terminal 10-1" to transponder 30-1" through interface I1' a link L10-1a', which couples an output of terminal 10-1' to splitter 12-1' through interface I2', and a link L10-1''', which bidirectionally couples terminal 10-1''' to transponder 30-1''' through interface I2'.

The manner in which the components of nodes 1" and 2" operate in response to a detection of a failure in the paths CP1 and/or CP1" is similar to that described above and shown in FIGS. 4a and 4b. However, in this embodiment, the controller 3''' responds to receiving a notification from the monitor block 4''' indicating that a failure has been detected in path CP1" (block A3) by 1) providing a failure signal to the controller 3" indicating that a failure has been detected in the path CP1", 2) configuring the switch 31' to cause that switch 31' to couple the output of protection transponder 32' to the first input-IP1''' of switch 22-1', and 3) configuring the switch 22-1' to couple its first input IP1''' to terminal 10-1', via link L10-1b' (block A4). Also, at block A6 the controller 3" configures the switch 31a to couple output OP2 of the splitter 12-1 from path CP1, to the transponder 32.

As a result of these switching operations, the failed communication path CP1" is bypassed, and an alternate communication path is established for routing signals output from the terminal 10-1 towards the terminal 10-1' (block A7). The established alternate communication path in this example includes the splitter 12-1, the switch 31a, the transponder 32, and the MUX/DEMUX 34 of node 1", as well as the transmission link L4, and the MUX/DEMUX 34', transponder 32', switch 31', and switch 22-1' of node 2". Also, at block A10, the controller 3''' responds to receiving the notification from monitor block 4''' at block A9 by reconfiguring the switch 22-1' to cause an output of the transponder 30-1' to be coupled again to the terminal 10-1', by way of link L10-1b'.

The manner in which the components of nodes 1" and 2" operate in response to a detection of a failure in the paths P1 and/or P1" is similar to that shown and described above with reference to FIGS. 5a and 5b. However, in this embodiment, the controller 3" responds to receiving the failure notification at block A3' by 1) providing, a failure signal to the controller 3''' to notify the controller 3''' of the failure in the path P1, and 2) configuring the switch 31a to couple the terminal 10-1" to the "protection" transponder 32', through protection link BL-1" and interface I1' (block A4'). Also, at block A6' the controller 3''' of node 2" configures the switch 31' to couple the transponder 32' to the terminal 10-1''', through interface I2' and protection link BL-1a'''.

As a result of these switching operations, an alternate communication path is established between the terminals 10-1" and 10-1''' (block A7'), and includes, in this example, link BL-1", switch 31a, transponder 32, MUX/DEMUX 34, link L4, MUX/DEMUX 34', transponder 32', switch 31', and the link BL-1a'''.

Figure 6:
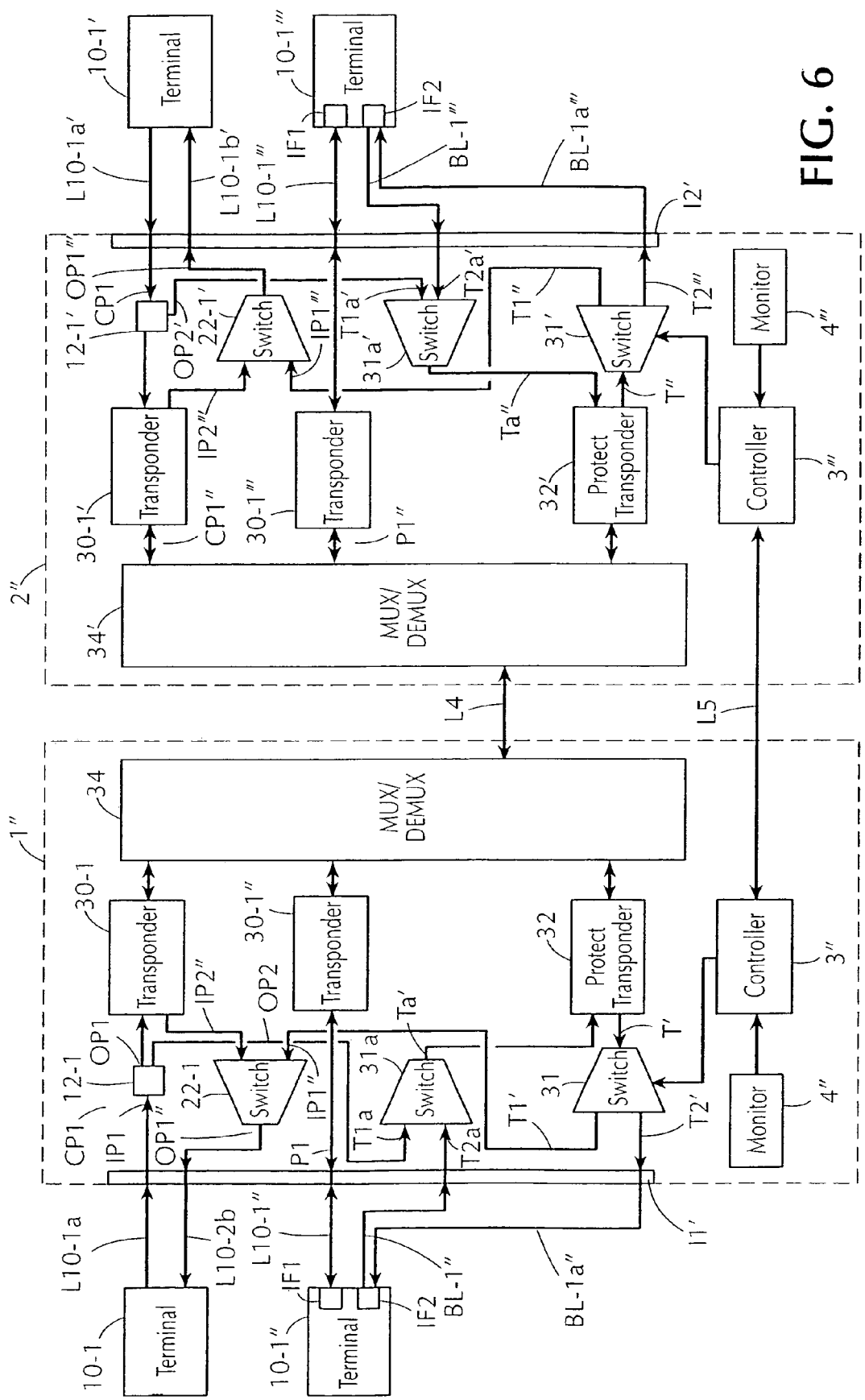
FIG. 6 shows an optical communications network that includes terminals and nodes constructed and operated in accordance with a further embodiment of this invention.

It should be noted that although this embodiment of the invention is described in the context of there being only the four terminals 10-1, 10-1', 10-1", and 10-1''' included in the network, more or less than this number of terminals may also be provided, and, as one skilled in the art would appreciate in view of this description, the switching arrangements depicted in FIG. 6 may be modified as deemed suitable to accommodate that number of terminals. It should also be noted that, although for simplicity the various components L10-1", L10-1''', 30-1, 30-1', 30-1", 30-1''', L4, L5, 32, 32', P1, and P1" of FIG. 6 are described herein in the context of being bidirectional, in other, preferred embodiments, corresponding unidirectional components may instead be employed. For example, two or more unidirectional links may be employed for each link L4, L5, L10-1", and L10''', two or more unidirectional transponders may be employed in lieu of each transponder 30-1, 30-1', 30-1", 30-1''', 32, and 32', each path P1 and P1" may include two or more unidirectional paths, and a separate multiplexer and demultiplexer may be employed in lieu of each MUX/DEMUX 34, 34'. Those having skill in the art would readily appreciate, in view of this description, the manner in which those components would be interconnected within the overall communication system.

A further embodiment of this invention will now be described, with reference again being made to FIG. 6. In accordance with this embodiment, the element 22-1 includes a 1×N coupler rather than a switch, and couples signals received at each of the inputs IP1" and IP2" to the output OP1". Also in this embodiment, the element 22-1' also includes a 1×N coupler rather than a switch, and couples signals received at each of the inputs IP1'" and IP2'" to the output OP1'". The manner in which the remaining components of the communication system operate is similar to that described above, except that no control of switches 22-1, 22-1' is performed, and the switching operations involve disabling (de-activating) and/or enabling (activating) selected ones of the transponders, as will be described below.

In accordance with this embodiment of the invention, the transponders 30-1, 30-1", and 32 are controllable by the controller 3" for being either activated or de-activated (e.g., turned on or off), and the transponders 30-1', 30-1'", and 32' of node 2" are controllable by the controller 3'" for being either activated or de-activated. For example, the controller 3'" responds to receiving the notification from the monitor block 4'" at block A3 by 1) providing the failure signal to the controller 3", 2) providing an enable signal to the transponder 32' to enable that transponder, if it is not already enabled, and 3) providing a control signal to the transponder 30-1' of the failed path CP1" for causing that transponder to become disabled 30-1' (block A4). Also, at block A6, in addition to configuring the switch 31a in the above-described manner, the controller 3" 1) enables the transponder 32, if not already enabled, and 2) disables the transponder 30-1 of node 1". As a result of these operations, signals that may be traversing the path CP1, the link L4, and/or the portion of the path CP1" appearing before the transponder 30-1', are prevented from reaching the terminal 10-1' (e.g., the failed communication path CP1" is bypassed), and the alternate communication path is established for routing signals received from terminal 10-1, to terminal 10-1'.

Also, at block A10, the controller 3'" responds to the notification received at block A9 by 1) notifying the controller 3" that the path CP1" has been repaired, 2) enabling the transponder 30-1', and 3) disabling the transponder 32'. Similarly, the controller 3" of node 1" responds to receiving the notification from the controller 3'" by 1) enabling the transponder 36-1, and 2) disabling the transponder 32. As a result, the communication paths CP1 and CP1" become active again for routing signals received from terminal 10-1, to the terminal 10-1', and any signals that may be traversing the portion of the alternate communication path appearing before the transponder 32' are prevented from reaching the terminal 10-1'.

It should be noted that it is not necessary to disable the transponders from both of the nodes 1" and 2" in order to prevent signals from reaching the terminal 10-1'. For example, in the case described above, only the transponder 30-1' or 32' of the node 2" closest to a receiving terminal 10-1' need be disabled to prevent signals applied to those devices from reaching that terminal 10-1'. It should also be noted that the transponders included in the nodes of the previously described embodiments (including, e.g., the one shown in FIG. 3) may also be controlled in the above-described manner for being enabled/disabled, and 1×N coupling devices may be employed in lieu of respective ones of the switches included in those embodiments.

Although the invention has been described above in the context of the various switching operations being implemented in response to a detection of a failure in a single communication path within a node, it is also within the scope of this invention to implement those operations in response to a detection of a failure in two or more of those paths. For example, and referring to the embodiment shown in FIG. 3, if monitor block 4" detects a failure in two or more of the paths P1-Pn of node 1', the controller 3" may respond by controlling the switch 31 to couple a selected, predetermined one of the switch inputs T1-Tn to the switch output T', for bypassing the failure in a corresponding one of the paths. Which one of the switch inputs T1-Tn is selected may be pre-programmed into the controller 3", and may be predetermined in accordance with applicable design and/or system operating criteria.

Moreover, although the invention has been described above in the context of the controllers 3, 3', 3", and 3'" being located within the protection modules 1a, 2a, 1a', and 2a', respectively, the invention is not limited to only such a configuration. By example, in other embodiments the controllers 3, 3', 3", 3'" may be located in other portions of the respective nodes. Also, it should be noted that although the invention is described in the context of the various switches being configured in response to a detection made by a monitor block 4, 4', 4", 4'", those switches may be configured in response to other suitable triggering events. As an example, it is within the scope of this invention to configure the switches in response to a user entering configuration command information into one or more of the controllers 3, 3', 3" and 3'", using a user interface. It is also within the scope of this invention to employ the optical sensors outside of one or more of the nodes 1, 1', 2, and 2' for detecting failures in, for example, the various links L10-1 to L10-n , L10-1' to L10-n', L10-1" to L10-n ", and L10-1'" to L10-n'", or to include sensor(s) in only one of the nodes.

While the invention has been particularly shown and described with respect to preferred embodiments thereof, it will be understood by those skilled in the art that changes in form and details may be made therein without departing from the scope and spirit of the invention.

What is claimed is:

1. A communication network, comprising:
at least one first terminal;
at least one second terminal;
a plurality of links;
at least one first node, coupled to both the at least one first terminal through at least a first one of the links and to the at least one second terminal through at least a second one of the links, the at least one first node also being coupled to the at least one first terminal through an additional link, the at least one first node comprising:
a plurality of first communication paths, each of the first communication paths being coupled at a first end thereof to at least one corresponding first link, wherein second ends of the first communication path are all coupled to the at least one second link, for providing a communication route between the first and second links,
at least one first alternate communication path having a first end coupled to the at least one second link and a second end coupled to the additional link,
at least one first switch coupled to the at least one first alternate communication path and coupled to the additional link through the at least one first alternate communication path,
a first detector for detecting a failure in at least one of the plurality of first communication paths, and
a first controller coupled to the first detector and to the at least one first switch, the first controller being responsive to the first detector detecting a failure in at least one of the first communication paths for controlling the at least one first switch to couple the at least one first alternate communication path and the additional link to the second link for routing a signal between the at least one first and second terminals through the at least one first alternate communication path and the additional link; and at least one second node interposed between the at least one second link and the at least one second terminal, the at least one first and second nodes being coupled together through the at least one second link, the at least one second node being coupled to the at least one second terminal through at least one third link, and wherein the at least one second node comprises:

a plurality of second communication paths, each having a first end and a second end, the first ends of the second communication paths being coupled to the at least one second link, the second end of each second communication path being coupled to a corresponding third link, for providing a communication route between the second and third links, at least one second alternate communication path having a first end coupled to the at least one second link, at least one second switch coupled to the at least one second alternate communication path, wherein the second switch has an input terminal and a plurality of output terminals, the input terminal of the second switch being coupled in the at least one second alternate communication path, a second detector for detecting a failure in at least one of the plurality of second communication paths, a second controller coupled to the second detector and to the at least one second switch, the second controller being responsive to the second detector detecting a failure in at least one of the second communication paths for controlling the at least one second switch to couple the at least one second alternate communication path to a corresponding third link, for routing a signal between that at least one second link and the third link through the at least one second alternate communication path, and a plurality of third switches, each third switch having a first input terminal coupled in a corresponding one of the second communication paths, a second input terminal coupled to a corresponding one of the output terminals of the second switch, and an output terminal coupled to the at least one third link, wherein the second controller responds to the second detector detecting a failure in a second communication path by controlling the second switch to couple signals received over the at least one second link to the second input terminal of the third switch coupled in the path, and by controlling that third switch to further couple those signals to the at least one third link.

2. A communication network as set forth in claim 1, wherein the first and second detectors detect the failure in the first and second communication paths, respectively, by detecting a loss of light in those respective paths.

3. A communication network as set forth in claim 1, wherein the at least one first node further comprises at least one first multiplexer/demultiplexer, the at least one second node further comprises at least one second multiplexer/demultiplexer, and wherein each of the first communication paths is coupled to a respective one of the second communication paths through the at least one second link and the first and second multiplexer/demultiplexer.

4. A communication network as set forth in claim 1, further comprising at least one splitter, wherein each splitter has an input terminal and a first output terminal that are both coupled in a respective one of the at least one first communication paths, and the first controller responds to the first detector detecting a failure in a first communication path by controlling the at least one first switch to couple a second output terminal of a corresponding splitter to the at least one second link through the at least one alternate communication path.

5. A communication network as set forth in claim 4, wherein the first node further comprises a multiplexer having an output coupled to the at least one second link, a first input coupled to an output of the first switch, and a plurality of second inputs each of which is coupled to a second end of a corresponding one of the first communication paths.

6. A communication network as set forth in claim 4, wherein the first node comprises a plurality of transponders, individual ones of the transponders being interposed in respective ones of the first communication paths.

7. A communication network as set forth in claim 6, and further comprising another transponder interposed in the at least one first alternate communication path.

8. A communication network as set forth in claim 4, wherein each first terminal transmits signals over only those ones of the first and second links that are coupled to the terminal and determined to be active by that terminal.

9. A communication network as set forth in claim 1, wherein the first and second controllers are coupled together through the at least one second link, the second controller also is responsive to the second detector detecting the failure in the second communication path for notifying the first controller of the failure, and wherein the first controller responds thereto by coupling the at least one first alternate communication path to a corresponding first link.

10. A communication network as set forth in claim 1, wherein the first detector detects the failure in the at least one first communication path by detecting a loss of light in that path.

11. A communication network as set forth in claim 1, further comprising a further second terminal coupled to the second node through both a corresponding third link and a fourth link, wherein at least one of the output terminals of the second switch is coupled to the fourth link.

12. A method for operating at least one line node of a communication network, the line node having a plurality of communication paths, each of which is coupled at a first end thereof through a first link to a first interface of a first terminal, each communication path having a second end coupled through at least one second link to at least one second terminal, each communication path including a transponder, the line node also being coupled to a second interface of the first terminal through at least one third link, the method comprising:

monitoring for a failure in at least one of the communication paths;

in response to detecting a failure in at least one of the communication paths:

switchably coupling the at least one third link, and thus the second interface of the first terminal, to the at least one second link, and disabling the transponder included that path; and coupling an output of at least one coupler to the at least one second link, and an input of the at least one coupler to the at least one third link;

wherein the switchably coupling is performed by enabling a further transponder coupled between the output of the at least one coupler and the at least one second link.

13. A method as set forth in claim 12, further comprising:
detecting the failure in the at least one communication path at the first terminal coupled to that path; and in response to detecting the failure at the first terminal, providing a signal from the second interface of the first terminal to the line node through the third link coupled to the first terminal.

14. A method as set forth in claim 12, further comprising notifying another node in the communication network of the detected failure.

15. A method as set forth in claim 12, further comprising prior to the monitoring:
connecting an output of a switch to the at least one second link;
connecting an input of the switch to a respective one of the third links; and
wherein the switchably coupling includes operating the switch to couple the respective third link to the at least one second link.

16. A method as set forth in claim 12, wherein the monitoring is performed in at least one other line node of the network.

17. A method as set forth in claim 16, further comprising notifying the line node of the failure in response to the other line node detecting a failure in the at least one communication path, and wherein the switchably coupling is performed in response to the notifying.

18. A method as set forth in claim 12, further comprising:
detecting when the failed communication path becomes active again; and
in response to detecting that the failed communication path has become active again, enabling the transponder included in that path.

19. A method as set forth in claim 12, wherein the monitoring includes monitoring for a loss of light in the at least one communication path.

20. A system, comprising at least one node, the at least one node comprising:
a plurality of first communication paths, each of the first communication paths being coupled at a first end thereof to at least one first link, and at a second end thereof to at least one corresponding second link, for providing a communication route between the first and second links;
at least one first alternate communication path having a first end coupled to the at least one first link;
at least one first switch coupled to the at least one first alternate communication path, wherein the first switch has an input terminal and a plurality of output terminals, the input terminal of the first switch being coupled in the at least one first alternate communication path; and
a plurality of second switches, each second switch having a first input terminal coupled in a corresponding one of the first communication paths, a second input terminal coupled to a corresponding one of the output terminals of the first switch, and an output terminal coupled to the at least one second link,
wherein the first switch is operable to switch between a first state in which it couples signals received over the at least one first link to an external communications terminal, and a second state in which it couples signals received over the least one first link to the second input terminal of the second switch coupled in the path, wherein the second switch is operable to couple those signals to another communications terminal through the at least one second link.

21. A system as set forth in claim 20, further comprising at least one other node coupled to the least one node through the at least one first link.

* * * * *

UNITED STATES PATENT AND TRADEMARK OFFICE
CERTIFICATE OF CORRECTION

PATENT NO. : 7,613,392 B2  Page 1 of 2
APPLICATION NO. : 11/497390
DATED : November 3, 2009
INVENTOR(S) : Ornan A. Gerstel It is certified that error appears in the above-identified patent and that said Letters Patent is hereby corrected as shown below:

COLUMN 1:

Line 65, "manner" should read --manner.--.

COLUMN 2:

Line 27, "terminals" should read --terminals.--.

COLUMN 5:

Line 33, "L10-n" should read --L10-n,--;
    Line 34, ", respectively," should read --respectively,--;
    Line 64, "15n ," should read --15n,--; and
    Line 65, "22n ," should read --22n,--.

COLUMN 6:

Line 10, "interface 12" should read --interface I2--;
    Line 15, "IP1''" should read --IP1'''--;
    Line 30, "-CPn1'',"  should read -- -CPn''',--; and
    Line 45, "demultip" should read --demultip- --.

COLUMN 7:

Line 55, "14n," should read --14-n,--.

COLUMN 8:

Line 10, "respond" should read --responds--.

Signed and Sealed this

First Day of June, 2010

David J. Kappos
*Director of the United States Patent and Trademark Office*

CERTIFICATE OF CORRECTION (continued)
U.S. Pat. No. 7,613,392 B2

COLUMN 10:

Line 5, "other" should be deleted.

COLUMN 11:

Line 2, "comprises" should read --comprise--; and
    Line 7, "BL1-BLh," should read --BL1-BLn,--.

COLUMN 12:

Line 6, "L10-n" should read --L10-n"--; and
    Line 7, "" and" should read --and--.

COLUMN 13:

Line 18, "311," should read --3"--.

COLUMN 14:

Line 34, "32'," should read --32,--.

COLUMN 15:

Line 44, "36-1," should read --30-1,--.

COLUMN 18:

Line 58, "included" should read --included in--.

COLUMN 20:

Line 25, "least" should read --at least--.